United States Patent
Kajita et al.

(10) Patent No.: US 9,419,490 B2
(45) Date of Patent: Aug. 16, 2016

(54) METHOD FOR CONNECTING WIRE MATERIAL AND TWISTED WIRE, AND STATOR OF ELECTRIC MOTOR OR GENERATOR

(75) Inventors: Daiki Kajita, Yokohama (JP); Nobuaki Nakasu, Kawasaki (JP); Hiroshi Hamano, Hitachinaka (JP); Yoshimi Mori, Mito (JP); Takeshi Matsuo, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 531 days.

(21) Appl. No.: 13/992,667

(22) PCT Filed: Nov. 11, 2011

(86) PCT No.: PCT/JP2011/006305
§ 371 (c)(1),
(2), (4) Date: Jul. 24, 2013

(87) PCT Pub. No.: WO2012/077281
PCT Pub. Date: Jun. 14, 2012

(65) Prior Publication Data
US 2013/0293045 A1    Nov. 7, 2013

(30) Foreign Application Priority Data

Dec. 10, 2010    (JP) .................................. 2010-275242

(51) Int. Cl.
*B23K 20/00*    (2006.01)
*B23K 20/10*    (2006.01)
*H02K 3/50*     (2006.01)
*H01R 43/02*    (2006.01)
(Continued)

(52) U.S. Cl.
CPC *H02K 3/50* (2013.01); *B23K 20/10* (2013.01); *B23K 31/02* (2013.01); *H01R 43/0207* (2013.01); *H02K 15/0062* (2013.01); *H02K 15/0075* (2013.01); *B23K 2201/32* (2013.01); *B23K 2201/38* (2013.01); *B23K 2203/12* (2013.01)

(58) Field of Classification Search
CPC . H01R 43/0207; H01R 4/023; B23K 2201/38
See application file for complete search history.

(56) References Cited

U.S. PATENT DOCUMENTS

| 7,459,653 | B2 * | 12/2008 | Steiner | ............... | B23K 11/0026 219/56 |
| 2004/0088857 | A1 * | 5/2004 | Fujimoto | ............... | H01R 11/12 29/871 |

FOREIGN PATENT DOCUMENTS

| JP | 54-43588 A | 4/1979 |
| JP | 2000-107872 A | 4/2000 |

(Continued)

OTHER PUBLICATIONS

Chinese Office Action issued in counterpart Chinese Application No. 201180059604.8 dated Sep. 14, 2015 (six pages).

(Continued)

*Primary Examiner* — Erin Saad
(74) *Attorney, Agent, or Firm* — Crowell & Moring LLP

(57) ABSTRACT

The present invention is directed to connection technology for providing a sufficient connection strength in bonding a wire material and a twisted wire each having a large diameter when directly bonding the wire material, which is used for a stator of an electric motor and a generator, and the twisted wire serving as a lead wire by ultrasonic bonding. A twisted wire having a plurality of core wires is hardened by ultrasonic vibration using a pressurized vibration tool when the twisted wire is connected to a wire material. After that, the twisted wire is reversed such that the hardened surface thereof faces the wire material and then comes into contact with the wire material. In this state, ultrasonic waves are applied to the hardened surface from the opposite side using the vibration tool, thereby connecting the hardened surface of the twisted wire and the wire material.

14 Claims, 8 Drawing Sheets

(51) Int. Cl.
*H02K 15/00* (2006.01)
*B23K 31/02* (2006.01)

(56) References Cited

FOREIGN PATENT DOCUMENTS

| JP | 2002-300745 | A | 10/2002 |
| JP | 2004-95293 | A | 3/2004 |
| JP | 2007-134307 | A | 5/2007 |
| JP | 4778369 | B2 | 9/2011 |

OTHER PUBLICATIONS

International Search Report dated Feb. 7, 2012 including English-language translation (Four (4) pages).

* cited by examiner

FIG.7
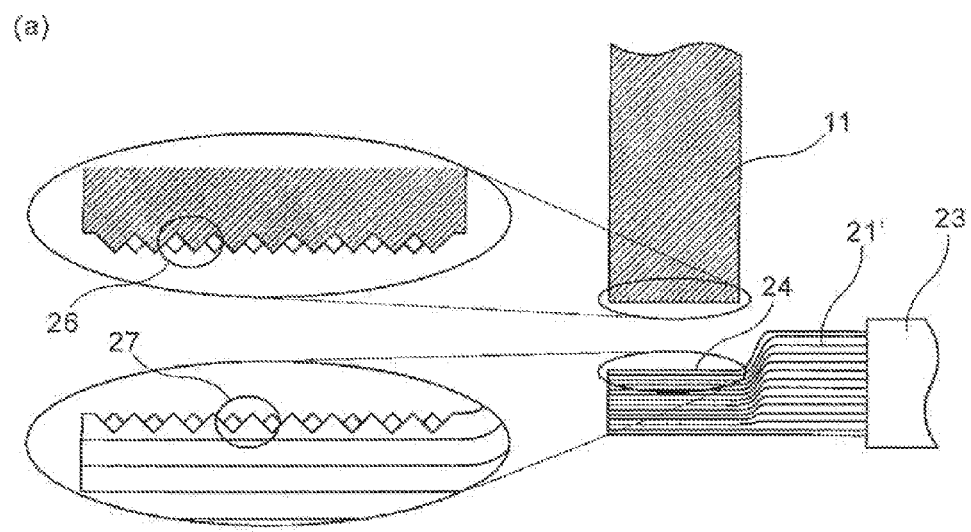
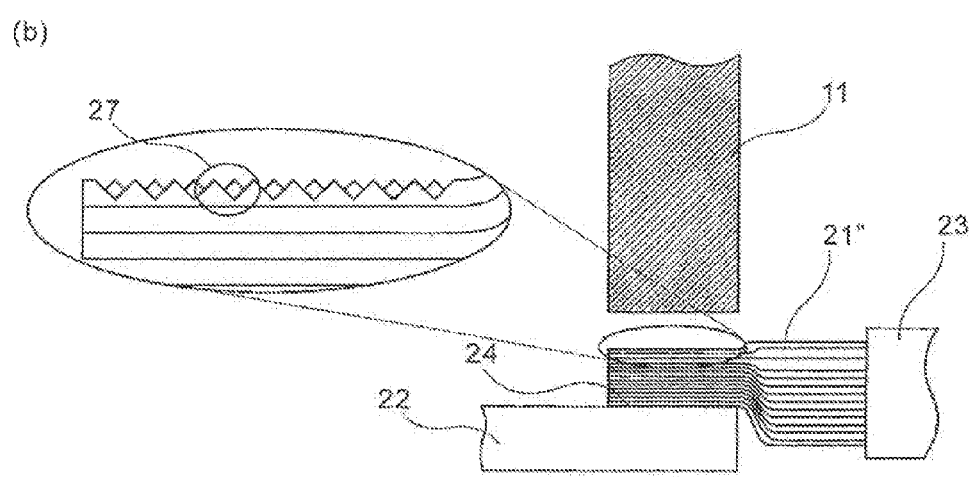

METHOD FOR CONNECTING WIRE MATERIAL AND TWISTED WIRE, AND STATOR OF ELECTRIC MOTOR OR GENERATOR

TECHNICAL FIELD

The present invention relates to a method for connecting a wire material, and to an electric motor or a generator using it.

BACKGROUND ART

The electric motor and the generator represented by a motor or an alternator have a single wire of copper, whose electric resistance is low, wound as a wire material around the core of a rotor or a stator, and generates a magnetic field by passing an electric current. The electric current passage of the electric motor and the generator with an outside power-supply unit is often performed with a twisted wire as a lead wire connected to an end of the wire material. Since the twisted wire is composed of a plurality of thin core wires, it has high flexibility and is used generally because it can be wired easily to the power-supply unit or the like.

As a method for connecting the end of this wire material and the twisted wire, there is a method using a caulking terminal. The wire material is connected to one end of the caulking terminal having a caulking part at both ends, and the twisted wire is connected to the other end by caulking. Therefore, there is an advantage that a connection work can be performed easily.

But, the caulking terminal has a disadvantage that the connected portion becomes large because the peripheries of the wire material and the twisted wire are surrounded by the caulking member.

In recent years, a compact and high-power electric motor such as an electric motor for a hybrid car or an electric car is demanded to be made compact including the connected portion of the wire material.

As another connecting method used instead of the caulking terminal, ultrasonic bonding is available. The ultrasonic bonding is a bonding method which uses a device comprising a vibration tool for ultrasonic oscillation and an anvil for fixing a member, holds the member between the vibration tool and the anvil, and applies ultrasonic vibration while pressurizing to cause a diffusion reaction on the interface between two bonding members. Since the ultrasonic bonding does not need to use an additional member such as the caulking terminal, it is effective to make the connected portion compact and to save a space.

A method for ultrasonic bonding of a twisted wire with another member is disclosed in Patent Literature 1. It shows that the twisted wire is previously hardened by ultrasonic bonding, and the hardened twisted wire and another connecting member are additionally bonded by ultrasonic waves. As another bonding member, a connection terminal is disclosed in its embodiments.

CITATION LIST

Patent Literature

PATENT LITERATURE 1: Japanese Patent Laid-Open No. 2004-95293

SUMMARY OF INVENTION

Technical Problem

The above-described method of Patent Literature 1, however, is hardly applicable to a high-power electric motor and generator which pass large current to the wire material. In other words, it is difficult to harden the whole twisted wire by ultrasonic bonding because the twisted wire as a lead wire has a large diameter.

Generally, there is a correlation between an ultrasonic frequency and a propagation distance of ultrasonic vibration in the ultrasonic bonding, and the propagation distance is said to be about 2 mm even by vibration at 20 KHz when the propagation distance of ultrasonic vibration is longest. When an overall diameter of the twisted wire is large and a hardened thickness is larger than the above-described propagation distance, the vibration tool side to which ultrasonic vibration is applied is hardened, but the twisted wire is not fully hardened on its opposite side, and the core wires remain as they are. Patent Literature 1 does not disclose a method of dealing with the above case.

Here, if a diameter (thickness) of the wire material wound on the core is smaller than the above described propagation distance, bonding can be made by applying ultrasonic vibration from the wire material side. But, since the wire material has a large diameter in the high-power electric motor and generator, the ultrasonic vibration does not propagate to the interface between the twisted wire and the wire material even if the ultrasonic vibration is applied from the wire material side, and bonding cannot be made.

The present invention has been achieved in view of the circumstances described above and aims to provide a wire material connecting method for directly bonding the wire material and the twisted wire having a large diameter of the electric motor and the generator by ultrasonic bonding, and a compact, high-power electric motor and generator which have the wire material and the twisted wire connected by the above connecting method.

Solution to Problem

To solve the above-described problems, the present invention, for example, in the method for connecting the twisted wire having a plurality of core wires and the wire material, performs connection including a first step that the twisted wire is hardened by ultrasonic vibration using a pressurized vibration tool, and a second step that the twisted wire and the wire material are connected by applying ultrasonic waves in the sate that the surface of the twisted wire hardened by pressurizing with the vibration tool is contacted to the wire material.

Advantageous Effects of Invention

According to the present invention, connection having sufficient bonding strength and a small connected portion can be obtained by a method for connecting a wire material for direct bonding by ultrasonic bonding of the wire material and the twisted wire having a large wire diameter of a high-power electric motor and generator.

BRIEF DESCRIPTION OF DRAWINGS

FIG. 7 shows views for explaining a method for connecting according to the first embodiment of the present invention, wherein (a) is a side view after hardening the twisted wire and an enlarged view of a bottom surface of the vibration tool and a top surface of the twisted wire, and (b) is a side view after the twisted wire and the wire material are bonded and an enlarged view of the top surface of the twisted wire.

DESCRIPTION OF EMBODIMENTS

Examples of the embodiments of the present invention are described below with reference to the drawings.

First Embodiment

One embodiment of the method for connecting the wire material of the present invention is described using FIG. 1 to FIG. 6.

Figure 3:
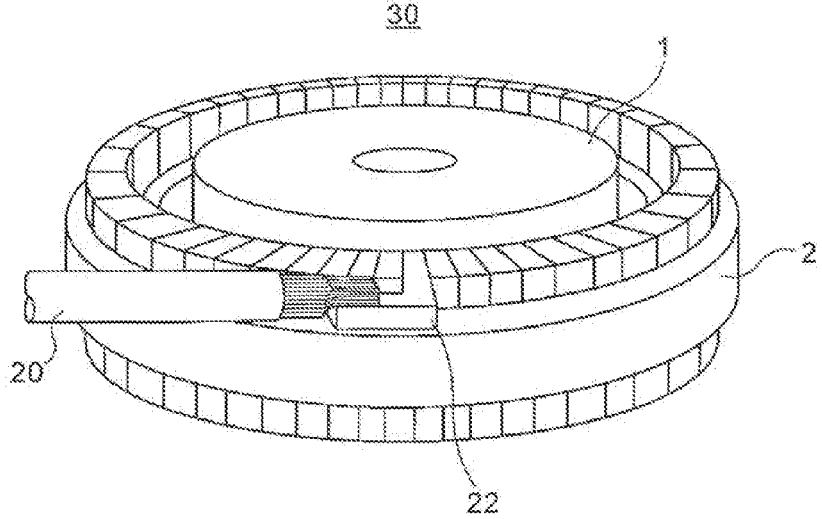
FIG. 3 is a view showing a structure of the electric motor according to the embodiment of the present invention.

FIG. 3 is a view illustrating a structure of an electric motor 30 according to one embodiment of the present invention. The electric motor 30 has a rotor 1, a stator core 2, and a wire material 22 wound on the stator core 2. A lead wire 20 is connected to an end of the wire material 22 to pass electric current to the electric motor 30. The wire material 22 is a single metallic wire, but for the lead wire 20, there is commonly used a twisted wire which allows the passage of large electric current and can have high flexibility so that it can be wired easily even if its diameter is large. The twisted wire is formed by twisting a plurality of core wires. The lead wire 20 represented by the twisted wire and the wire material 22 are desirably connected without using another bonding member in view of electric resistance and dimensions of the connected portion.

Figure 2:
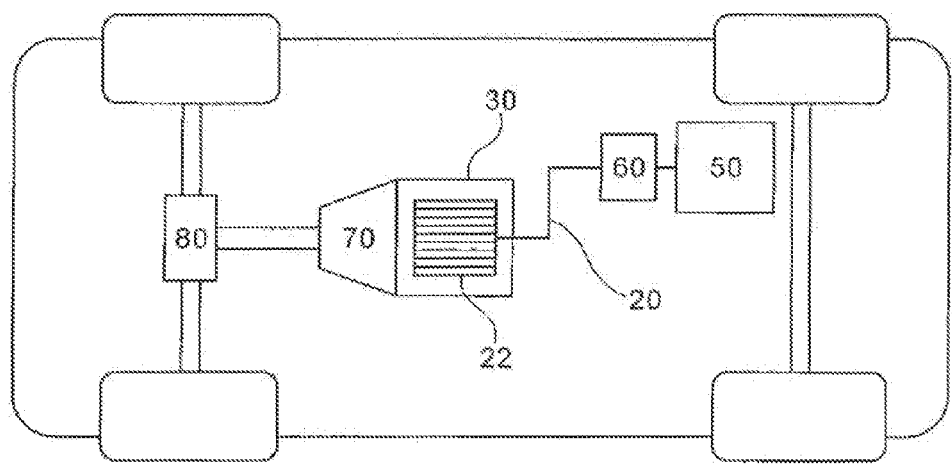
FIG. 2 is a schematic view of an electric vehicle provided with the electric motor according to an embodiment of the present invention.

FIG. 2 is a view illustrating a structure of the electric vehicle as one example of using the electric motor 30. An electric vehicle 40 is mounted with the electric motor 30, and the electric motor 30 is connected to a battery 50 via an electric power converter 60 by the lead wire 20 and supplied with high-voltage DC power. Thus, the obtained rotation torque based on the electric motor 30 is transmitted to a transmission 70 and a gear 80 to play a role to drive the electric vehicle.

A method of connecting the lead wire 20 and the wire material 22 is described. The connecting method of this embodiment is largely comprised of two steps. That is, they are a first step of hardening the twisted wire 20 and a second step of bonding the hardened twisted wire 20 and the wire material 22.

Figure 1:
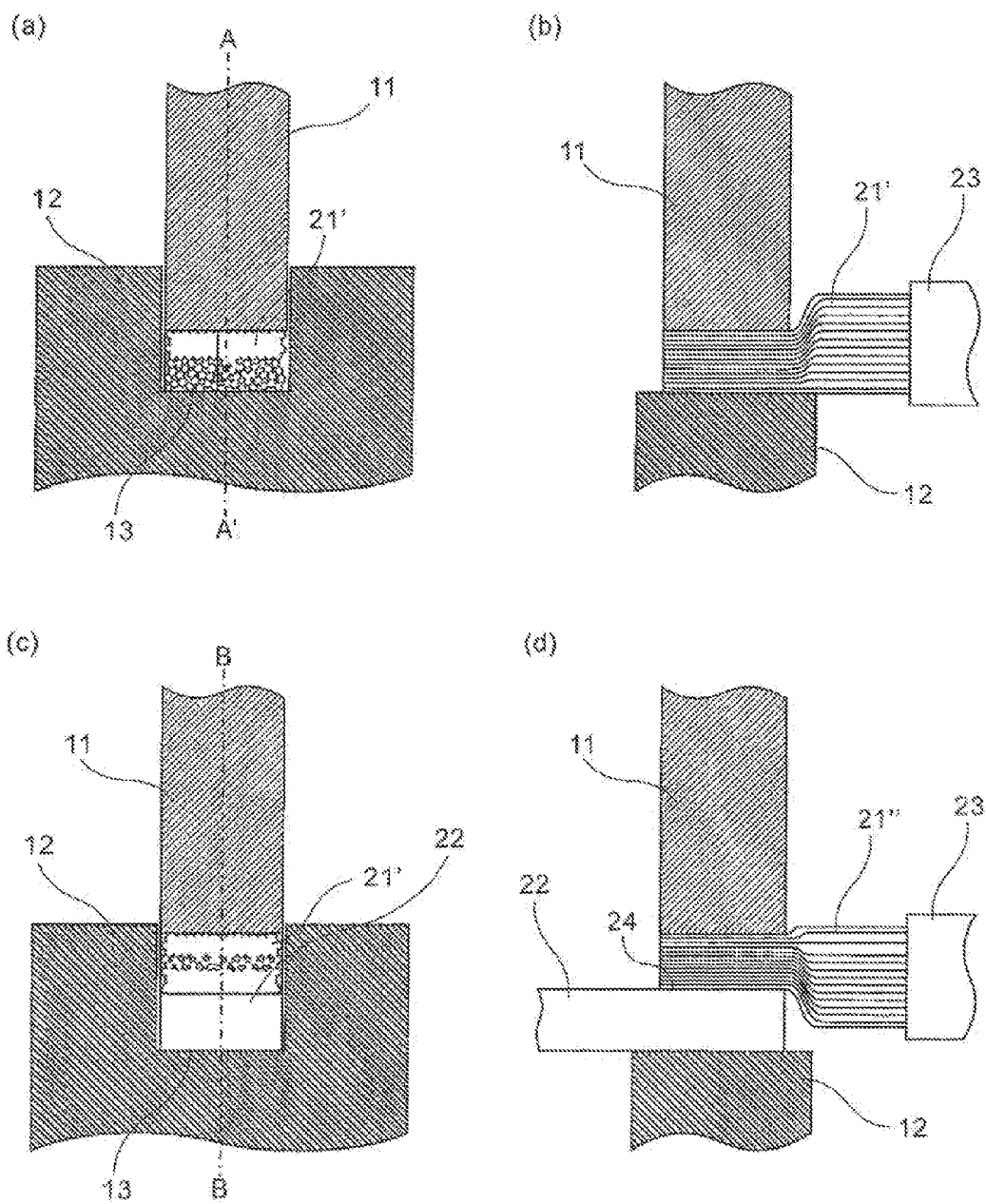
FIG. 1 shows views for explaining a method for connecting as a first embodiment of the present invention, in which (a) is a front view after the twisted wire is hardened, (b) is a sectional view taken along A-A' section of (a), (c) is a front view after the twisted wire and the wire material are connected, and (d) is a sectional view taken along B-B' section of (c).

A processing method of the wire material in this embodiment has the first step to harden the twisted wire and the second step to connect the hardened twisted wire and the wire material. FIG. 1(*a*) is a front view after the twisted wire was hardened in the first step, (b) is a sectional view taken along A-A' section of (a), FIG. 1(*c*) is a front view after the twisted wire hardened in the second step and the wire material were bonded, and (d) is a sectional view taken along B-B' section of (c).

In the first step, a twisted wire 21 becomes a twisted wire 21' by being applied with ultrasonic vibration from a top surface by a vibration tool 11 so as to be hardened from a substantially circular cross-sectional shape into a rectangular shape same as that of the groove of an anvil 12. In the second step, the wire material 22 is placed on a bottom surface 13 of the groove formed in the anvil 12, the twisted wire 21' hardened in the first step is reversed from the state of FIGS. 1(*a*) and (*b*), placed on the wire material 22, and applied with ultrasonic vibration from the top surface by the vibration tool 11 to become a twisted wire 21".

Figure 4:
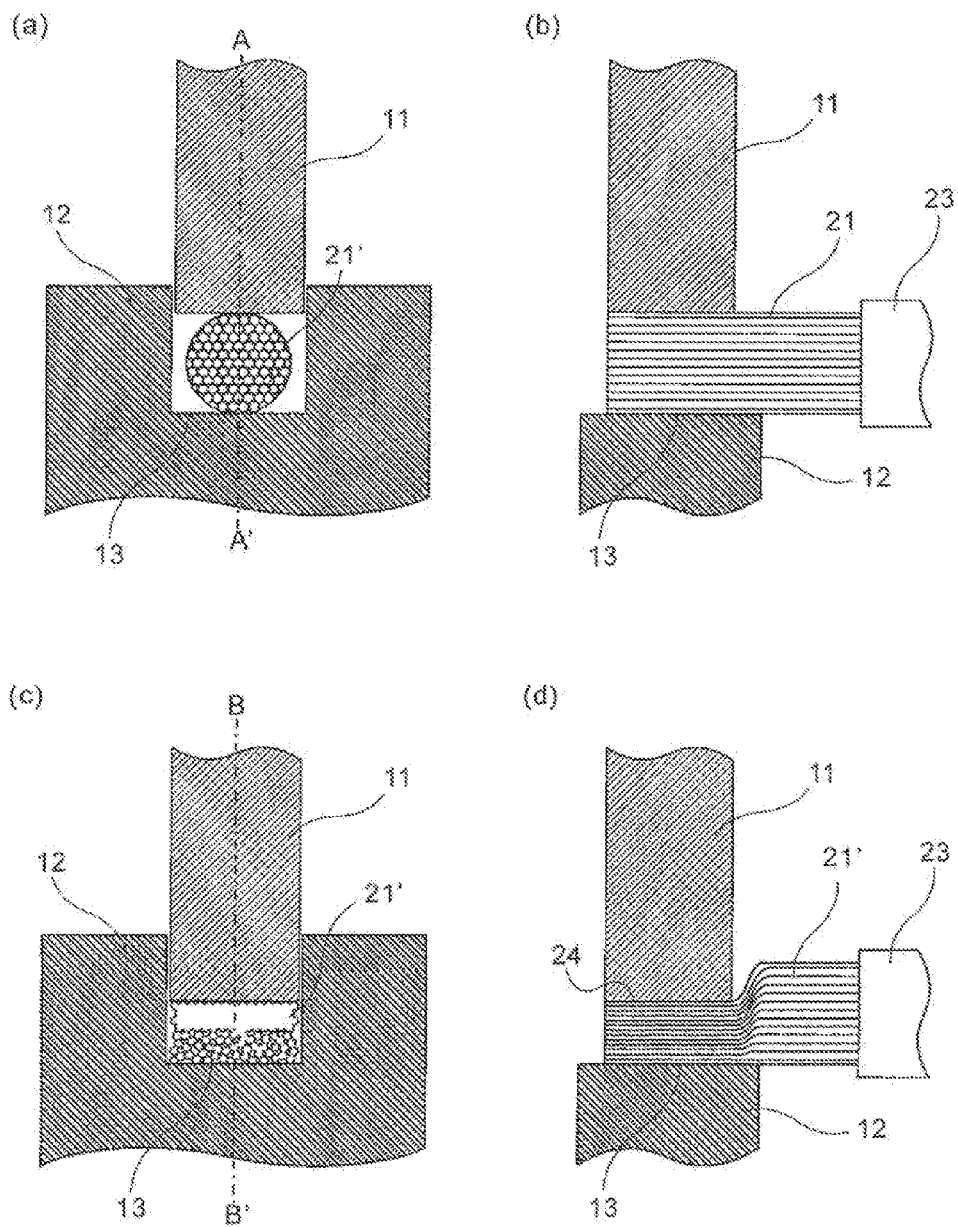
FIG. 4 shows views for explaining a detailed procedure of hardening the twisted wire as a first step in the method for connecting as the first embodiment of the present invention, wherein (a) is a front view when the twisted wire is placed on an anvil, (b) is a sectional view taken along A-A' section of (a), (c) is a front view after the twisted wire is hardened, and (d) is a sectional view taken along B-B' section of (c).

FIG. 4 is views for explaining in detail the procedure of hardening the twisted wire as the first step in the connecting step. In the first step, the twisted wire 21 having a substantially circular cross section in FIGS. 4(*a*) and (*b*) is placed on the bottom surface 13 of the groove formed in the anvil 12 so as to be held between it and the vibration tool 11. Then, when the ultrasonic vibration is applied from the vibration tool 11 to the twisted wire 21 while applying a predetermined pressurizing force as shown in FIGS. 4(*c*) and (*d*), core wires on the top surface of the twisted wire 21, namely on a bonding surface 24 side, are mutually bonded to become the twisted wire 21' hardened along the groove shape of the anvil 12. In this embodiment, a pressurizing surface of the vibration tool 11 has a substantially flat surface in order to fit the shape of the twisted wire 21 to the shape of the bonding surface of the wire material 22. Here, the pressurizing surface of the vibration tool 11 has a later-described minute irregular shape for propagation of ultrasonic waves, but the substantially flat surface means that a basic shape excluding the minute irregular shape is a flat surface. And, the shape of the groove of the anvil 12 is determined to be rectangular in order to apply evenly a pressure to the twisted wire 21.

Figure 5:
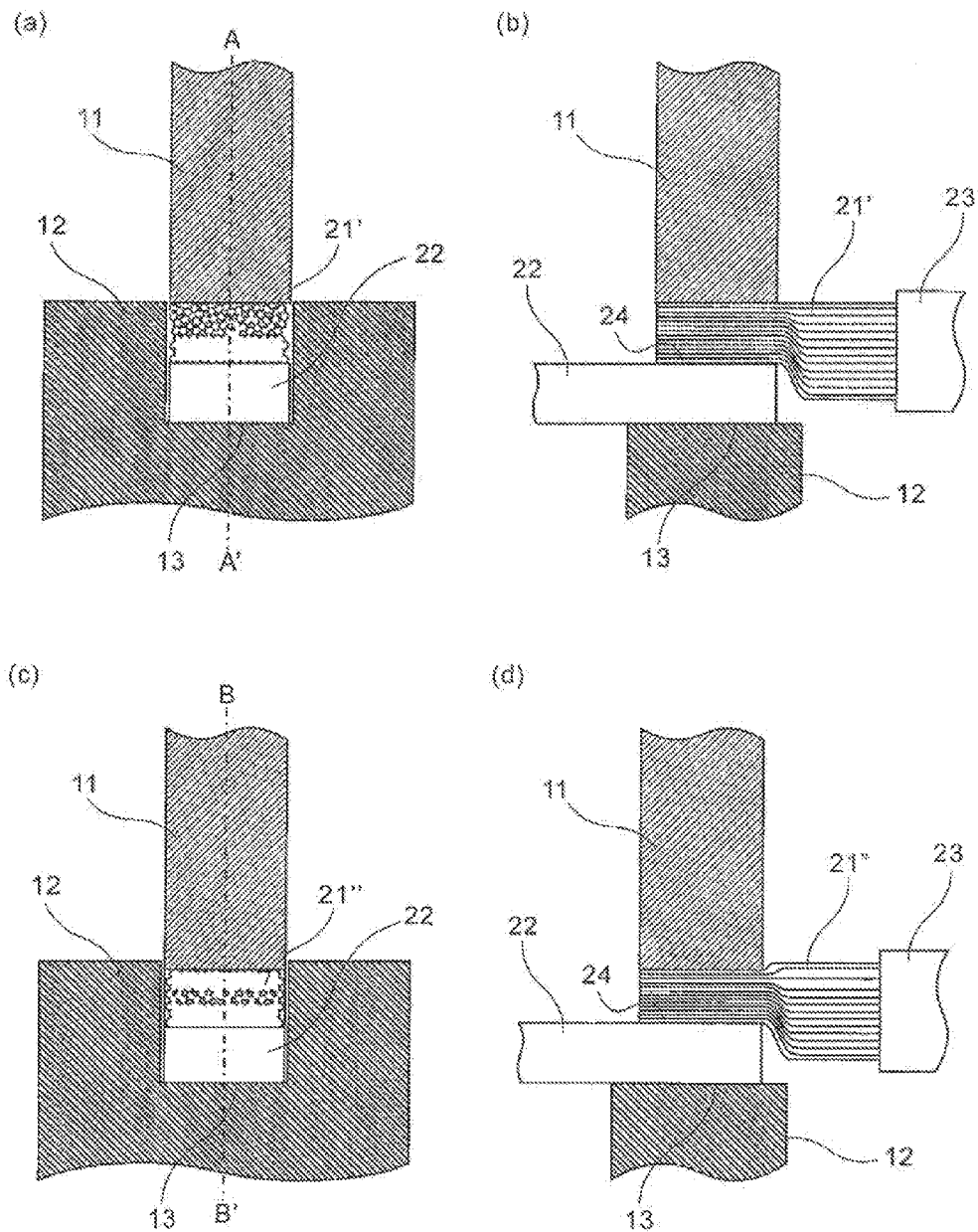
FIG. 5 shows Views for explaining a detailed procedure of connecting the twisted wire and the wire material as a second step in the method for connecting according to the first embodiment of the present invention, wherein (a) is a front view when the wire material is placed on the anvil and the twisted wire is placed on the wire material, (b) is a sectional view taken along A-A' section of (a), (c) is a front view after the twisted wire and the wire material are connected, and (d) is a sectional view taken along B-B' section of (c).

FIG. 5 is views explaining in detail a procedure in bonding the hardened twisted wire and the wire material in the second step of the connecting step. In the second step, the twisted wire 21' hardened in FIGS. 4(*c*) and (*d*) is axially reversed as shown in FIGS. 5(*a*) and (*b*) and placed on the wire material 22, which is placed on the bottom surface 13 of the groove formed in the anvil 12 and has substantially the same cross section as that of the groove of the anvil 12, and ultrasonic vibration is applied to the twisted wire 21' by applying a predetermined pressurizing force by the vibration tool 11 from above in FIGS. 5(a) and (b). The twisted wire 21" is additionally hardened its top surface and diffusion bonded to the top surface of the wire material 22 with the bonding surface 24 on the under surface of the twisted wire. As a result, as shown in FIGS. 5(c) and (d), the twisted wire 21' becomes the twisted wire 21" as the core wires on the vibration tool 11 side are bonded mutually and additionally hardened, and an interfacial diffusion reaction is caused on the bonding surface 24 of the twisted wire 21" and the top surface of the wire material 22 so as to bond, thereby obtaining connection of the wire material 22 and the twisted wire 21". In this embodiment, since the vibration tool 11 and the anvil 12 are formed to harden the twisted wire 12 into a vertically symmetrical rectangular shape, the same vibration tool 11 and anvil 12 can be used in the first step and the second step, but not only the above, different vibration tool 11 and anvil 12 may be used depending on the circumstance of the facilities.

Since the bonding of the twisted wire and the wire material obtained in the above-described two steps allows direct bonding without using the connecting member, there can be obtained the connected portion having a size same as or not larger than the cross-sectional area of the twisted wire and the wire material before connection.

Figure 6:
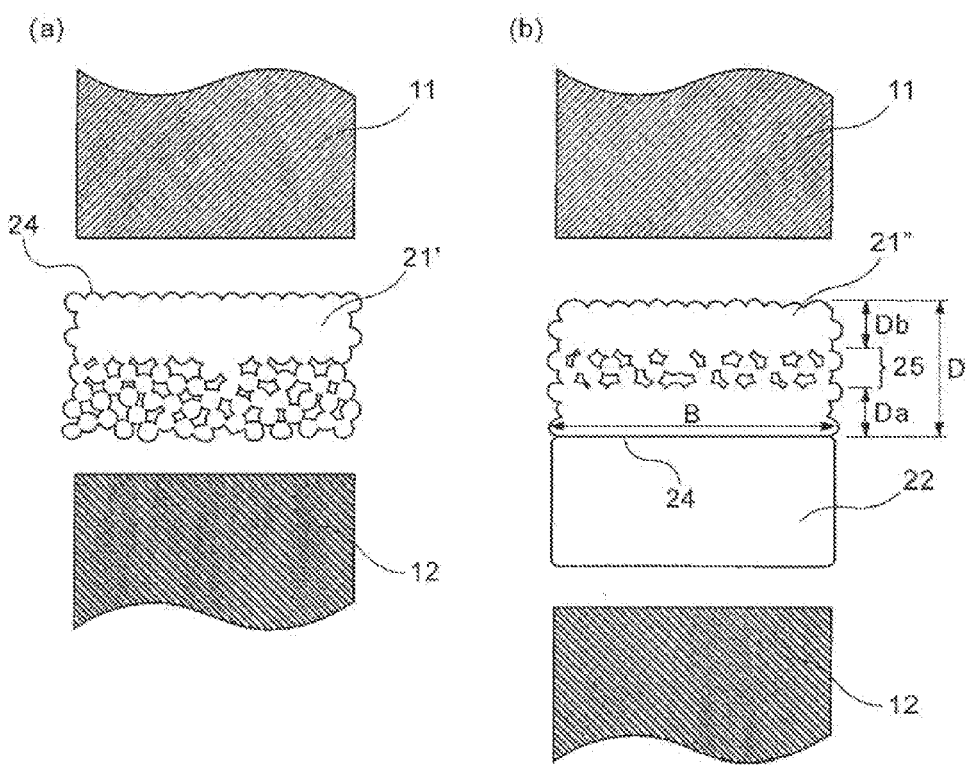
FIG. 6 shows views for explaining a method for connecting according to the first embodiment of the present invention, wherein (a) is a sectional view after the twisted wire is hardened, and (h) is a sectional view after the twisted wire and the wire material are bonded.

FIG. 6 is views showing a change of the cross-sectional shape of the twisted wire in the first and second connecting steps. FIG. 6(a) is a sectional view when the twisted wire 21 was hardened to become the twisted wire 21' in the first step. The top surface of the twisted wire 21' which is the side applied with ultrasonic vibration by the vibration tool 11 has the core wires mutually bonded and hardened densely, but since the under surface of the twisted wire 21' on the anvil 12 side does not receive propagation of ultrasonic vibration, the core wires are mutually bonded sparsely or not bonded.

FIG. 6(b) is a sectional view when the twisted wire 21" and the wire material 22 are bonded in the second step. The top surface of the twisted wire of FIG. 6(b), namely the surface on the side opposite to the bonding surface 24 of the twisted wire, has unification of the core wires advanced similar to the bonding surface 24, but its middle portion has a portion 25 where the core wires have not been unified (small bonding). In the portion 25 where the core wires have not been unified, a binding force of the core wires is low and vibration is caused easily, so that ultrasonic vibration can be propagated without attenuating as in the solid. Thus, even if an overall thickness D of the twisted wire 21" is larger than the propagation distance of ultrasonic waves, the portion 25 where the core wires are not unified acts as an ultrasonic wave transmission layer if thickness Da and Db of the unified part of the twisted wire are smaller than the propagation distance, and there can be obtained ultrasonic bonding between the bonding surface 24 of the twisted wire 21" and the top surface of the wire material 22. Since the core wires are partly unified in the twisted wire 21" bonded with the wire material 22, an apparent cross-sectional area obtained from an overall breadth B and the thickness D of the twisted wire inevitably becomes smaller than the overall cross-sectional area of the twisted wire before hardening.

FIG. 7 is views showing a change in appearance of the twisted wire surface in the connecting step. FIG. 7(a) is a side view after the hardened twisted wire 21' was formed by applying ultrasonic vibration to the twisted wire 21 by the vibration tool 11 in the first step. An under surface of the vibration tool 11 is provided with an irregular shape 26 for catching a bonding member so as to facilitate the propagation of the ultrasonic waves. The twisted wire 21' which was hardened by application of ultrasonic vibration has impressions 27, which are transcribed irregular shapes, remained on the surface contacted with the vibration tool 11. It is determined in this embodiment that the irregular shape 26 has quadrangular pyramids arranged in a net-like appearance but its shape can be changed to a net-like arrangement of square pillars or a ridge-and-root arrangement in the axial direction of the twisted wire as long as the bonding member can be caught.

FIG. 7(b) is a side view after the twisted wire 21' and the wire material 22 were bonded in the second step. The twisted wire 21" hardened in the second step also has the impressions 27 having the irregular shape remained on the surface on the opposite side of the bonding surface 24. Therefore, the twisted wire 21" has a feature that it has the irregular shape on the bonding surface 24 and its opposite face.

According to the above-described first embodiment, the ultrasonic vibration is applied from the vibration tool 11 to the twisted wire 21, the hardened twisted wire 21' is reversed and ultrasonic bonded with the wire material 22, so that the portion 25 where the core wires are not unified acts as the ultrasonic wave transmission layer, and connection having sufficient bonding strength can be obtained in connecting the twisted wire and the wire material having a large wire diameter.

For example, when an ultrasonic bonding machine having an ultrasonic frequency of 20 kHz and a vibration tool tip-end area of 40 mm$^2$ was used to connect a twisted wire having an overall diameter of 5 mm which comprises copper core wires having a diameter of 0.4 mm and a number of 80 and a wire material which is a copper square wire having a cross-sectional shape with a breadth of 4 mm and a thickness of 3 mm, there was obtained connection with a sufficient bonding strength of about 1500 N.

Second Embodiment

A second embodiment of the present invention is described with reference to FIG. 8 and FIG. 9.

Figure 8:
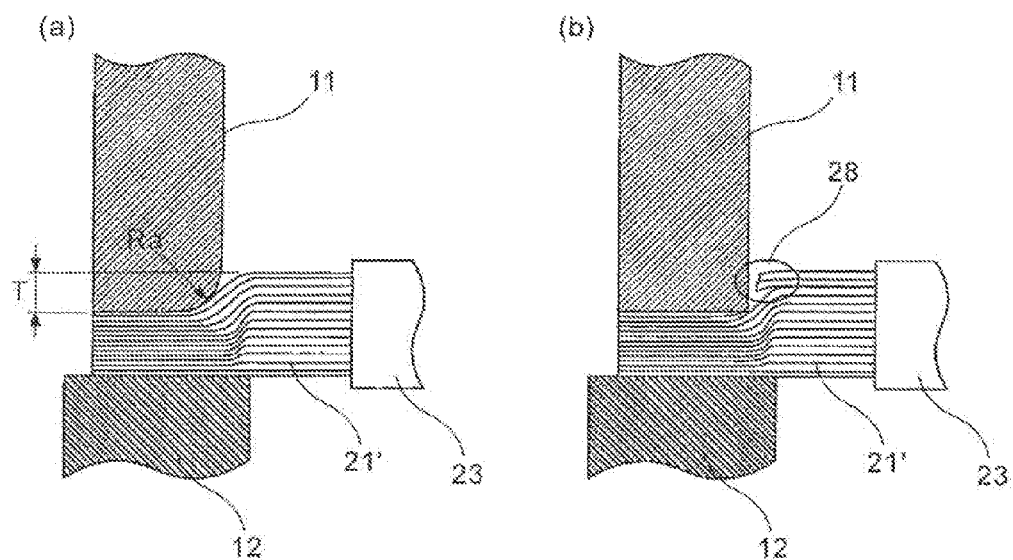
FIG. 8 shows views for illustrating a method for connecting according to a second embodiment of the present invention, wherein (a) shows the vibration tool with its end surface provided with a curved surface, and (b) shows the vibration tool with its end surface not provided with a curved surface.

FIG. 8 is another embodiment explaining the first step in the connecting step described in the first embodiment, FIG. 8(a) shows a case that a vibration tool not having a curved surface on its end surface was used, and FIG. 8(b) shows a case that a vibration tool having one curved surface on its end surface was used.

When the curved surface is not provided but a corner is provided around the end portion of the vibration tool 11 as in FIG. 8(a), disconnection 28 occurs in the core wires of the twisted wire 21 if the twisted wire 21' has a large deformation amount T. The disconnection of the core wires generates resistance at the passage of electric current and must be prevented because it becomes a cause of generating heat in the disconnection portion and creates an adverse effect on the peripheral members.

On the other hand, the vibration tool 11 in FIG. 8(b) has a feature that a curved surface Ra is formed on the end portion of the under surface. When this vibration tool 11 is used to harden the twisted wire 21 by ultrasonic bonding, the core wires are not broken even if the twisted wire 21' had a large deformation amount T. And, an effect of preventing the wire breaking can be further obtained when a curvature radius of the curved surface Ra is determined to be same to or not smaller than the deformation amount T of the twisted wire 21'.

For example, in a case where a copper twisted wire which has an overall diameter of 5 mm, a core wire diameter of 0.4 mm, and a core wire number of 80 is hardened to have a rectangular cross-sectional shape having a breadth of 3.5 mm and a thickness of 3 mm, the core wires of the twisted wire were broken when the vibration tool 11 was not formed with the curved surface, but when a curved surface having a curvature radius of 2 mm was formed on the end portion of the under surface of the vibration tool 11, there was obtained an effect that the core wires of the twisted wire were not broken.

Figure 9:
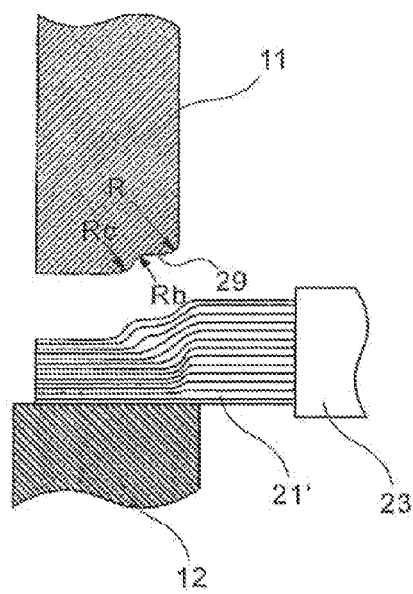
FIG. 9 is a view for illustrating a method for connecting according to the second embodiment of the present invention, showing a plurality of curved surfaces formed on the bottom surface of the vibration tool.

FIG. 9 is another embodiment explaining the first step in the connecting step described in the first embodiment and shows a case using a vibration tool which is formed with stepped portions comprising three curved surfaces including one curved surface at the end surface.

The vibration tool 11 in FIG. 9 has a feature that a stepped portion 29 was formed on the under surface. In the twisted wire 21' hardened by the vibration tool 11, the portion pressurized by the stepped portion 29 has the pressurizing force and the deformation amount T decreased, so that there is provided an effect of preventing wire breaking. And, in a case where the stepped portion 29 is formed on the under surface of the vibration tool 11, an effect of preventing the wire breaking can be further obtained by setting a height of the stepped portion 29 to a level same as or not larger than the diameter of core wires of the twisted wire 21 and forming curved surfaces Ra, Rb, Rc on an end portion of the stepped portion 29. In FIG. 9, an example of the vibration tool 11 formed with the stepped portion comprising three curved surfaces was explained, but the same effect can also be obtained by disposing more stepped portions.

According to the above-explained second embodiment, by forming the curved surface on a part of the under surface of the vibration tool 11, the core wires can be prevented from breaking when a twisted wire having a large wire diameter is hardened.

Third Embodiment

Figure 10:
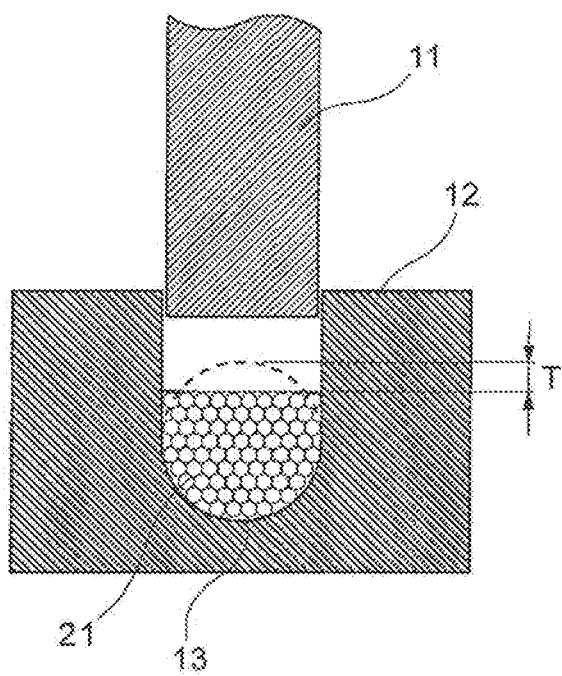
FIG. 10 is a view for illustrating a method for connecting according to a third embodiment of the present invention, showing an anvil with a curved surface formed on its bottom surface, and an anvil having a flat bottom surface.

A third embodiment of the present invention is explained with reference to FIG. 10. FIG. 10 is another embodiment explaining the first step in the connecting step explained in the first embodiment and shows a case using an anvil having the bottom surface of the groove formed into a round shape.

The anvil 12 in FIG. 10 has a feature that the bottom surface 13 of the groove is a curved surface having a curvature radius which is substantially same as the cross-sectional shape of the twisted wire 21 before it was hardened, and when the twisted wire 21 is hardened by ultrasonic bonding, the core wires below the twisted wire 21 are restrained from moving, a deformation amount T of the twisted wire 21' becomes small, and the core wires can be prevented from breaking.

For example, when copper twisted wires having an overall diameter of 5 mm, a core wire diameter 0.4 mm and a core wire number of 80 were hardened and the bottom surface of the groove was formed into a rectangular shape having a breadth of 5 mm, core wires were broken. But, when the bottom surface of the groove was formed to have a curvature radius of 2.5 mm, the deformation amount of the twisted wire became about ½ time, and there was obtained an effect that the core wires of the twisted wire were not broken.

In addition, the connected portion is caused to vibrate due to vibration caused when the electric motor or the generator is used and has a possibility of colliding with another member to damage it, but there can also be obtained an effect that no damage might be caused even if it collides with another member by connecting the twisted wire, which has its cross-sectional shape hardened partly to have the curved surface, with the wire material.

The present invention was specifically explained above based on the embodiments, but it is also possible to use in combination the above types of inventions separately explained above. And, the case that the cross-sectional shape of the twisted wire was circular before it was hardened was explained as an example, but even when the twisted wire has another cross-sectional shape, a similar effect can be obtained by forming the shape of the bottom surface of the groove to have substantially the same shape as the cross-sectional shape of the twisted wire before hardening. That is, it is needless to say that the present invention is not limited to the above-described embodiments of the present invention and various modifications can be made within the spirit and the scope of the present invention in ultrasonic bonding of the twisted wire and the wire material.

REFERENCE SIGNS LIST

1: Rotor, 2: stator core, 11: vibration tool, 12: anvil, 13: bottom surface of groove in anvil where a bonding member is placed, 20: lead wire, 21: twisted wire, 22: wire material, 23: coating, 24: bonding surface, 25: part of twisted wire where core wires are not unified, 26: irregular shape formed on under surface of vibration tool, 27: impressions, 28: breakage of core wires, 29: stepped portion on under surface of vibration tool, 30: electric motor, 40: electric vehicle, 50: battery, 60: electric power converter, 70: transmission, 80: gear, D: overall breadth of twisted wire after applying ultrasonic waves, D: overall thickness of twisted wire after applying ultrasonic waves, Da: thickness of part where core wires of twisted wire are unified, Db: thickness of part where core wires of twisted wire are unified, Ra: curved surface of end portion of vibration tool under surface, Rb: curved surface of under surface of vibration tool, Rc: curved surface of under surface of vibration tool, T: deformation amount in thickness direction of twisted wire when the twisted wire was hardened.

The invention claimed is:

1. A method for connecting a twisted wire having a plurality of core wires and a wire material, the method comprising:
   a first step of hardening the twisted wire by ultrasonic vibration using a pressurized vibration tool to form a hardened surface,
   a second step of flipping the twisted wire, so that the hardened surface directly contacts the wire material, and
   a third step of connecting the twisted wire and the wire material by applying ultrasonic waves with the surface of the twisted wire, which is hardened by pressurizing with the pressurized vibration tool, kept in contact with the wire material.

2. The connecting method according to claim 1, wherein: the surface of the vibration tool pressurized to the twisted wire in the first step is a substantially flat surface, and a portion of the wire material connected to the twisted wire is a substantially flat surface.

3. The connecting method according to claim 1, wherein: ultrasonic waves are applied to the hardened surface of the twisted wire by pressuring with the pressurized vibration tool in the second step.

4. The connecting method according to claim 1, wherein: the pressurized vibration tool used in the first step has a curvature on the end portion thereof.

5. The connecting method according to claim 1, wherein: the pressurized vibration tool used in the first step is recessed in a part thereof that touches the wire along the axial direction of the twisted wire.

6. The connecting method according to claim 1, wherein:
the first step is performed with the twisted wire held between the pressurized vibration tool and an anvil, and
a portion of the anvil for sandwiching the twisted wire has a rectangular shape.

7. The connecting method according to claim 1, wherein:
the first step is performed with the twisted wire held between the pressurized vibration tool and an anvil, and
the portion of the anvil for sandwiching the twisted wire has a round shape or an oval shape.

8. The connecting method according to claim 3, wherein:
the first step and the second step use the same pressurized vibration tool.

9. A method for connecting a twisted wire having a plurality of core wires and a wire material, the method comprising:
a first step of hardening the twisted wire by ultrasonic vibration using a pressurized vibration tool to form a first hardened surface,
a second step of flipping the twisted wire, so that the first hardened surface directly contacts the wire material,
a third step of connecting the twisted wire and the wire material by applying ultrasonic waves with a second surface of the twisted wire, which is hardened by pressurizing with the pressurized vibration tool, kept in contact with the wire material, wherein
ultrasonic waves are applied to the second hardened surface of the twisted wire by pressuring with the pressurized vibration tool in the third step, and
the first step and the second step use the same pressurized vibration tool.

10. The connecting method according to claim 9, wherein:
the surface of the pressurized vibration tool pressurized to the twisted wire in the first step is a substantially flat surface, and
a portion of the wire material connected to the twisted wire is a substantially flat surface.

11. The connecting method according to claim 9, wherein:
the pressurized vibration tool used in the first step has a curvature on the end portion thereof.

12. The connecting method according to claim 9, wherein:
the pressurized vibration tool used in the first step is recessed in a part thereof that touches the wire along the axial direction of the twisted wire.

13. The connecting method according to claim 9, wherein:
the first step is performed with the twisted wire held between the pressurized vibration tool and an anvil, and
a portion of the anvil for sandwiching the twisted wire has a rectangular shape.

14. The connecting method according to claim 9, wherein:
the first step is performed with the twisted wire held between the pressurized vibration tool and an anvil, and
the portion of the anvil for sandwiching the twisted wire has a round shape or an oval shape.

* * * * *